Jan. 17, 1967  R. M. STEVENS  3,298,248
TORSIONAL IMPACT LIMITER
Filed Nov. 2, 1964
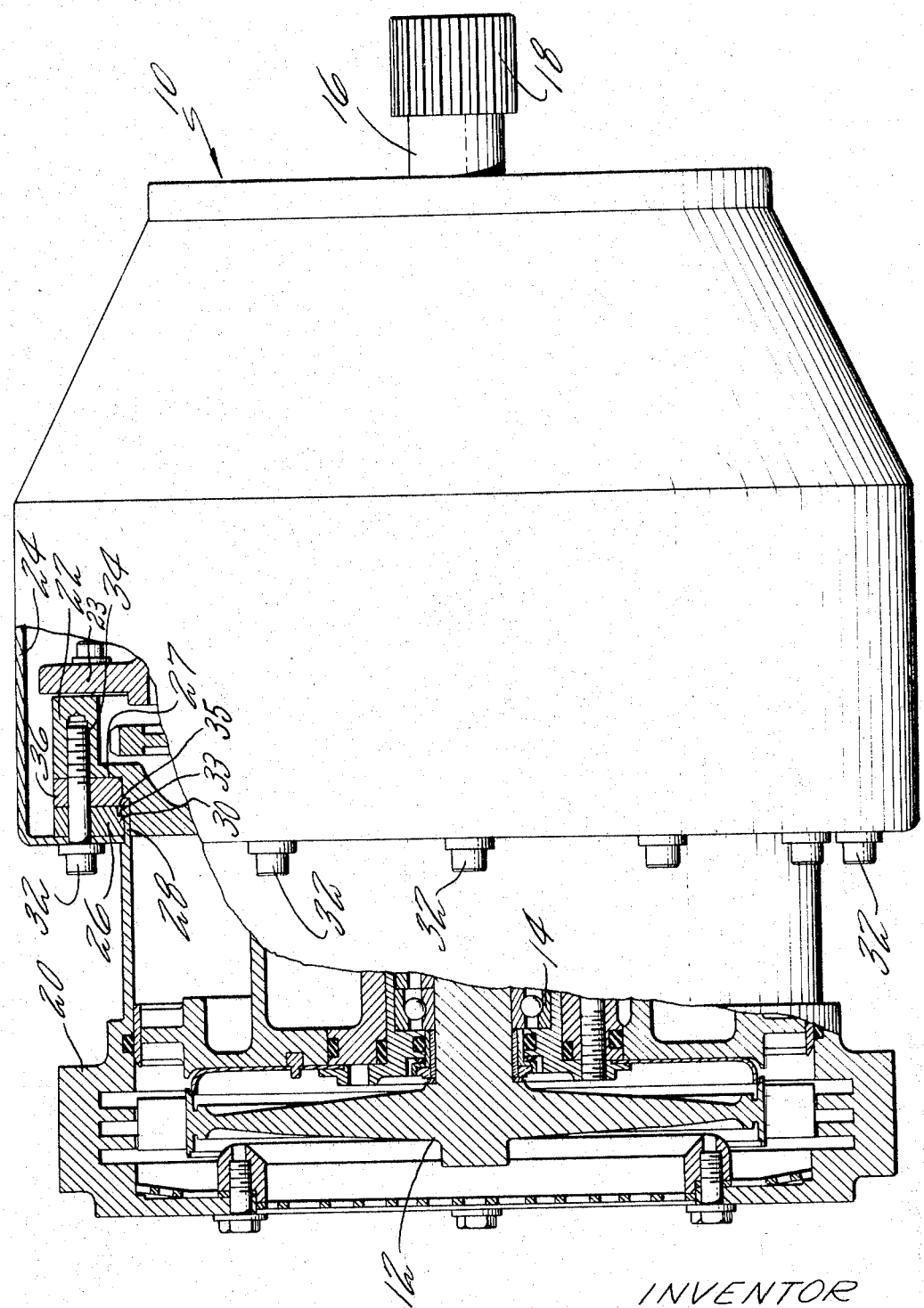
INVENTOR
RICHARD M. STEVENS
BY Norman Friedland
ATTORNEY

United States Patent Office 3,298,248
Patented Jan. 17, 1967

3,298,248
TORSIONAL IMPACT LIMITER
Richard M. Stevens, Winsted, Conn., assignor to United Aircraft Corporation, East Hartford, Conn., a corporation of Delaware
Filed Nov. 2, 1964, Ser. No. 408,307
8 Claims. (Cl. 74—609)

This invention relates to rotating machinery and particularly to mechanism for preventing structural damage occasioned by a fragment dislodging from the rotating mechanism.

This invention constitutes an improvement over the mechanism disclosed and claimed in U.S. application Serial No. 356,848 filed on April 2, 1964, by Edward A. Rothman and assigned to the same assignee. As was disclosed in this application, a containment ring having a series of grooves on the internal diameter spanning across the turbine blade is located adjacent the outer periphery thereof and serves to dissipate the energy of a dislodged fragment occasioned upon bursting of the turbine rotor or blade so as to contain and restrain said dislodged fragment. However, due to the rotational movement of the dislodged fragment upon impinging the containment housing, it imparts both a radial and tangential force which tangential force tends to rotate the containment housing relative to the fixed structural members of the rotating machinery. This tangential or circumferential force imparted to the containment housing tends to rotate a portion of the housing with respect to the remaining portion of the housing resulting in a fracture thereof. Obviously, this is undesirable since this renders the entire housing unusable.

I have found that I can obviate this disadvantage so that the occurrence of this is eliminated and the remaining housing and structural support members can be re-used by providing means for limiting the torsional impact by mounting the housing in such a manner that the containment housing portion is allowed to rotate proportionally to the torsional load relative to the remaining portion of the housing and thus dissipate the excessive rotational energy.

It is therefore an object of this invention to provide means in a rotating mechanism for preventing breakage or fracturing of the structural supporting mechanism thereof occasioned by high transient torsional loads associated with the bursting of the rotating mechanism.

Other features and advantages will be apparent from the specification and claims and from the accompanying drawing which illustrate an embodiment of the invention.

The sole figure is an elevated view partly in section illustrating a typically rotating mechanism which in this instance is a turbine driven starter for aircraft application showing the details of this invention. It is to be understood that while this invention has particular utility in the starter application as described, it also has utility in any type of rotating mechanism as is obvious to one skilled in the art.

The starter generally indicated by numeral 10 comprises a turbine 12 suitably supported by bearings 14 for rotational movement. The turbine is coupled to output shaft 16 by suitable gearing and clutch mechanism (not shown) in a well-known manner for driving an aircraft engine and the like which engages spline 18 rigidly secured to the end of shaft 16. The housing of the starter 10 consists of containment housing 20 similar to the one disclosed and claimed in the U.S. application Serial No. 356,848, which serves to restrain and contain dislodged fragments that may separate from the turbine 12 in the event of a turbine burst, and support housing members 22 and 23 serving to support the internal mechanism of the starter. A preformed sheet metal covering 24 encloses the starter assembly. The output end of the starter contains suitable mounting elements to mount the starter in its environment.

In accordance with this invention an annular clamp ring 26 is mounted at the end of containment housing 20 and an adjacent annular flange 27 extends upwardly on the end of support housing 22. A recess 28 formed at the outer periphery and on the aft end of containment housing 20 receives the clamp ring 26. A projecting portion 30 formed on the inner diameter of clamp ring 26 fits into recess 28.

A plurality of bolts 32 extending through openings in clamp ring 26 screw into a complementary tapped hole formed in flange 27 for securing the containment housing to the support housing 22.

A hard metal ring 36 may be interposed between clamp ring 26 and flange 27 if the material of the housing 22 is relatively soft, such as aluminum.

Hence, during a burst, the blades of the turbine rotor severing therefrom fly outwardly and are prevented from leaving the immediate area by containment housing 20. These fragments impart not only a radial load but also a tangential load to the containment housing which, in turn, transmits the load to the other housing and supporting elements of the starter. The overall effect is to tend to rotate the housings relative to the center line of the assembly. This rotating or circumferential force which occurs over an extremely short period of time, therefore, imparts a high torsional impact load to these members resulting in a possible fracture.

However, the ring clamp which serves as a torsional impact limiter, reduces this impact load to the other housings 22 and 23 and supporting elements of the starter and prevents such fracture from occurring. This is because the clamp ring 26 allows the containment housing 20 to rotate relative to the support housing 22. The slippage between the interfaces 33 and 35 of containment housing 20, clamp ring 26, and support housing 22 is a function of the difference between the torsional impact load and the restraining force of the joint. This slippage prevents severe loads from being transmitted to the remaining portion of the starter so that these elements are reusable, notwithstanding bursting of the turbine.

It should be understood that the invention is not limited to the particular embodiments shown and described herein, but that various changes and modifications may be made without departing from the spirit or scope of this novel concept as defined by the following claims.

I claim:
1. A protective device for rotating machinery having a rotating member which is susceptible to bursting comprising:
 a housing supporting the rotating member;
 normally stationary containment means surrounding the rotating member for containing, and absorbing energy from, a fragment dislodged from the rotating member; and
 means for supporting and attaching said containment means to said housing, said means allowing angular movement between said containment means and said housing when the torque tending to rotate said containment means exceeds a predetermined limit;
 whereby the maximum torque transmitted to said housing upon bursting and impact of the rotating member against the containment means will be limited.

2. A protective device for rotating machinery as defined in claim 1 wherein said means for supporting and attaching said containment means to said housing comprises:
 means for radially positioning and supporting said containment means about said rotating element;

a radially extending annular flange on said containment means;
an annular contact surface on said housing corresponding to a surface on said flange; and
means for applying a force to said flange tending to hold said flange against said contact surface;
whereby the containment means will rotate with respect to said housing when the torque on said containment means exceeds the friction force at the interface between said flange and said housing.

3. A protective device for rotating machinery as defined in claim 1 wherein said means for supporting and attaching said containment means to said housing comprises:
  means for radially positioning and supporting said containment means about said rotating element; and
  means for axially positioning said containment means and frictionally restraining said containment means against rotation when the torque tending to rotate said containment means is below a predetermined valve.

4. A device as defined in claim 1 wherein said means for supporting and attaching said containment means to said housing is axially spaced from said rotating member so that said attaching means will not be damaged in the event that portions of the rotating member pass through said containment means upon bursting of the rotating member.

5. A protective device for rotating machinery as defined in claim 4 wherein said means for supporting and attaching said containment means to said housing comprises:
  means for radially positioning and supporting said containment means about said rotating element;
  a radially extending annular flange on said containment means;
  an annular contact surface on said housing corresponding to a surface on said flange; and
  means for applying a force to said flange tending to hold said flange against said contact surface;
whereby the containment means will rotate with respect to said housing when the torque on said containment means exceeds the friction force at the interface between said flange and said housing.

6. The device as defined in claim 2 wherein said means for applying a force to said flange is comprised of:
  a retaining ring adapted to be bolted to the contact surface of said housing,
  said retaining ring having a radially projecting annular flange which is axially spaced from the side of the ring in contact with said housing so as to form an annular channel adapted to enclose said flange on said containment means; and
  means for bolting said retaining ring to said housing.

7. The device as defined in claim 5 wherein said means for applying a force to said flange is comprised of:
  a retaining ring adapted to be bolted to the contact surface of said housing,
  said retaining ring having a radially projecting annular flange which is axially spaced from the side of the ring in contact with said housing so as to form an annular channel adapted to enclose said flange on said containment means; and
  means for bolting said retaining ring to said housing.

8. A protective device for rotating machinery having a rotating member which is susceptible to bursting comprising:
  a housing supporting a rotating member;
  normally stationary containment means surrounding the rotating member for containing and absorbing energy from a fragment dislodged from the rotating member; and
  means for supporting and attaching said containment means to said housing solely by axial clamping forces to permit angular movement between said containment means and said housing when the torque tending to rotate said containment means upon bursting on impact of the rotating member against the containment means exceeds a predetermined limit.

References Cited by the Examiner
UNITED STATES PATENTS 2,987,296 6/1961 Furguson _____ 253—77
3,241,813 3/1966 Von Flue et al. _____ 253—39

FRED C. MATTERN JR., *Primary Examiner.*

W. S. RATLIFF, *Assistant Examiner.*